(12) United States Patent
Clabunde et al.

(10) Patent No.: US 7,450,108 B2
(45) Date of Patent: Nov. 11, 2008

(54) OPERATING UNIT, ESPECIALLY FOR OPERATING A MULTIMEDIA SYSTEM IN A MOTOR VEHICLE

(75) Inventors: Andreas Clabunde, Regensburg (DE); Helmut Dörre, Aschach (DE); Hans Kinzler, Regensburg (DE); Nhu Nguyen Thien, Regensburg (DE); Oliver Pichl, Baierdorf-Hagenau (DE)

(73) Assignee: Siemens Aktiengesellschaft, München (DE)

( * ) Notice: Subject to any disclaimer, the term of this patent is extended or adjusted under 35 U.S.C. 154(b) by 233 days.

(21) Appl. No.: 10/476,120

(22) PCT Filed: Apr. 26, 2002

(86) PCT No.: PCT/DE02/01526

§ 371 (c)(1),
(2), (4) Date: Dec. 4, 2003

(87) PCT Pub. No.: WO02/089047

PCT Pub. Date: Nov. 7, 2002

(65) Prior Publication Data

US 2004/0132498 A1    Jul. 8, 2004

(30) Foreign Application Priority Data

Apr. 27, 2001 (DE) .............................. 101 20 691

(51) Int. Cl.
*G06F 3/033* (2006.01)
*G09G 5/08* (2006.01)
*H01H 3/00* (2006.01)

(52) U.S. Cl. ............................ 345/157; 345/161; 200/18
(58) Field of Classification Search ................. 345/156, 345/157, 1, 161, 184; 74/471 XY, 485, 553; 463/38; 200/18
See application file for complete search history.

(56) References Cited

U.S. PATENT DOCUMENTS

| 4,194,155 | A |   | 3/1980  | Hirai et al. |
|-----------|---|---|---------|--------------|
| 5,229,764 | A | * | 7/1993  | Matchett et al. ............ 340/5.52 |
| 5,270,689 | A |   | 12/1993 | Hermann |
| 5,543,592 | A | * | 8/1996  | Gaultier et al. ............. 200/6 A |
| 5,589,828 | A | * | 12/1996 | Armstrong .................... 341/20 |
| 6,059,660 | A | * | 5/2000  | Takada et al. ................. 463/38 |
| 6,148,094 | A |   | 11/2000 | Kinsella |
| 6,154,201 | A |   | 11/2000 | Levin et al. |
| 6,433,777 | B1 | * | 8/2002 | Sawyer ........................ 345/161 |

(Continued)

FOREIGN PATENT DOCUMENTS

DE    296 04 717 U1    7/1996

(Continued)

*Primary Examiner*—Bipin Shalwala
*Assistant Examiner*—Steven E Holton
(74) *Attorney, Agent, or Firm*—Cohen Pontani Lieberman & Pavane LLP

(57) ABSTRACT

The invention relates to an operating unit, especially for operating a multimedia system in a motor vehicle, comprising an operating element that can be rotated about an axis (z), that can be moved along said axis of rotation (z) and that can be locked in a position (0, 1) on said axis (z). The operating element can also be moved on an plane (x, y) that is orthogonal relative to said axis (z) in order to control the movement of a cursor that can be shown on a display in any given direction.

12 Claims, 2 Drawing Sheets

U.S. PATENT DOCUMENTS

| | | | |
|---|---|---|---|
| 2001/0033268 A1 * | 10/2001 | Jiang | 345/163 |
| 2002/0041273 A1 | 4/2002 | Dirksen et al. | |
| 2002/0196233 A1 * | 12/2002 | Kataoka et al. | 345/161 |

FOREIGN PATENT DOCUMENTS

| | | |
|---|---|---|
| DE | 197 32 287 A1 | 1/1999 |
| DE | 197 52 054 A1 | 5/1999 |
| DE | 200 14 425 U1 | 2/2001 |
| FR | 2 718 862 A1 | 4/1994 |
| WO | WO 00/42493 | 7/2000 |
| WO | WO 01/02206 A1 | 1/2001 |

* cited by examiner

OPERATING UNIT, ESPECIALLY FOR OPERATING A MULTIMEDIA SYSTEM IN A MOTOR VEHICLE

This is a U.S. national stage of application No. PCT/DE 02/01526, filed on 26 Apr. 2002. Priority is claimed on that application and on the following application(s): Country: Germany, Application No.: 101 20 691.7, Filed: 27 Apr. 2001.

BACKGROUND OF THE INVENTION

1. Field of the Invention

The invention relates to an operator control unit, in particular for operating a multimedia system in a motor vehicle, having an operator control element which can be rotated about an axis and displaced along this axis and can be latched in a position on this axis.

Such an operator control element is known from U.S. Pat. No. 5,270,689. There, by rotating a rotary switch about an axis, a specific function is selected from a menu represented on a screen, and confirmed by pressing the switch. Inadvertent confirmation can be rescinded by pulling the switch. As a result of the confirmation, the unit is changed over into another menu in which a selection is possible in the same way.

SUMMARY OF THE INVENTION

The object of the invention is to develop an operator control unit of the generic type in such a way that more comfortable operator control of a multimedia system becomes possible even when the functionality is increased.

According to the present invention, an operator control unit is embodied in such a way that the operator control element can be displaced in at least one plane which is orthogonal with respect to its axis of rotation in order to actuate the movement of a cursor in any desired direction, which cursor can be represented on a screen of the multimedia system. The operator control element can therefore be used in the manner of a joystick so that not only is it possible to select specific elements from a permanently predefined number of elements which can be represented on a screen, for example from a menu, but also any desired points on a screen can be selected, as is known from the cursor in personal computers which is controlled by a mouse.

This is possible with only one operator control element in a vehicle which is arranged as ergonomically as possible, for example on the center console, so that the driver of the vehicle can operate the associated multimedia system easily and conveniently.

The operator control element may not only be pressed or pulled out of the position of rest in the direction of axis of rotation, but also may be latched in at least one further position so that, in a further plane, convenient rotation of the operator control element or any desired movement in this plane is possible without the operator control element having to be held in this plane by the operator.

The operator control element may assume, in each plane, a position of rest into which it can be reset by means of restoring elements by the operator after a deflection. In this way, the operator can assume that whenever the operator control element is released the cursor is at a predetermined point. In addition, the operator control element must be moved counter to the force of the restoring elements, which usually permits a more uniform movement.

The operator control unit may additionally have a touchpad which either can or else cannot rotate along with the rotatable part of the operator control element. The touchpad can be used for recognizing script or else can be moved in order to move the cursor on the screen of the multimedia system. In addition, it is possible to dispense with the movement in a plane which is orthogonal with respect to the axis of rotation of the operator control element in order to move the cursor and only use the touchpad for this purpose.

In order to identify authorized users, it is also possible to integrate a fingerprint sensor into the operator control unit.

In one embodiment of the invention, the speed of the cursor which can be represented on the screen of the multimedia system is a function of the distance covered by the deflection of the operator control element from its position of rest. The function may be, for example, an e function but also may be proportional to the deflection of the operator control element.

As a result of the diverse activation possibilities of the operator control element it is possible to assign a specific advantageous functionality to each activation possibility. Thus, it is possible, for example, in a particularly advantageous way to enter a main menu from any desired position of the various operator control menus by pulling the operator control element, in other words by moving the operator control element in the direction of its axis of rotation.

BRIEF DESCRIPTION OF DRAWINGS

The invention will be described in more detail below with reference to an exemplary embodiment using figures, in which.

DETAILED DESCRIPTION OF THE PRESENTLY PREFERRED EMBODIMENTS

Figure 1:
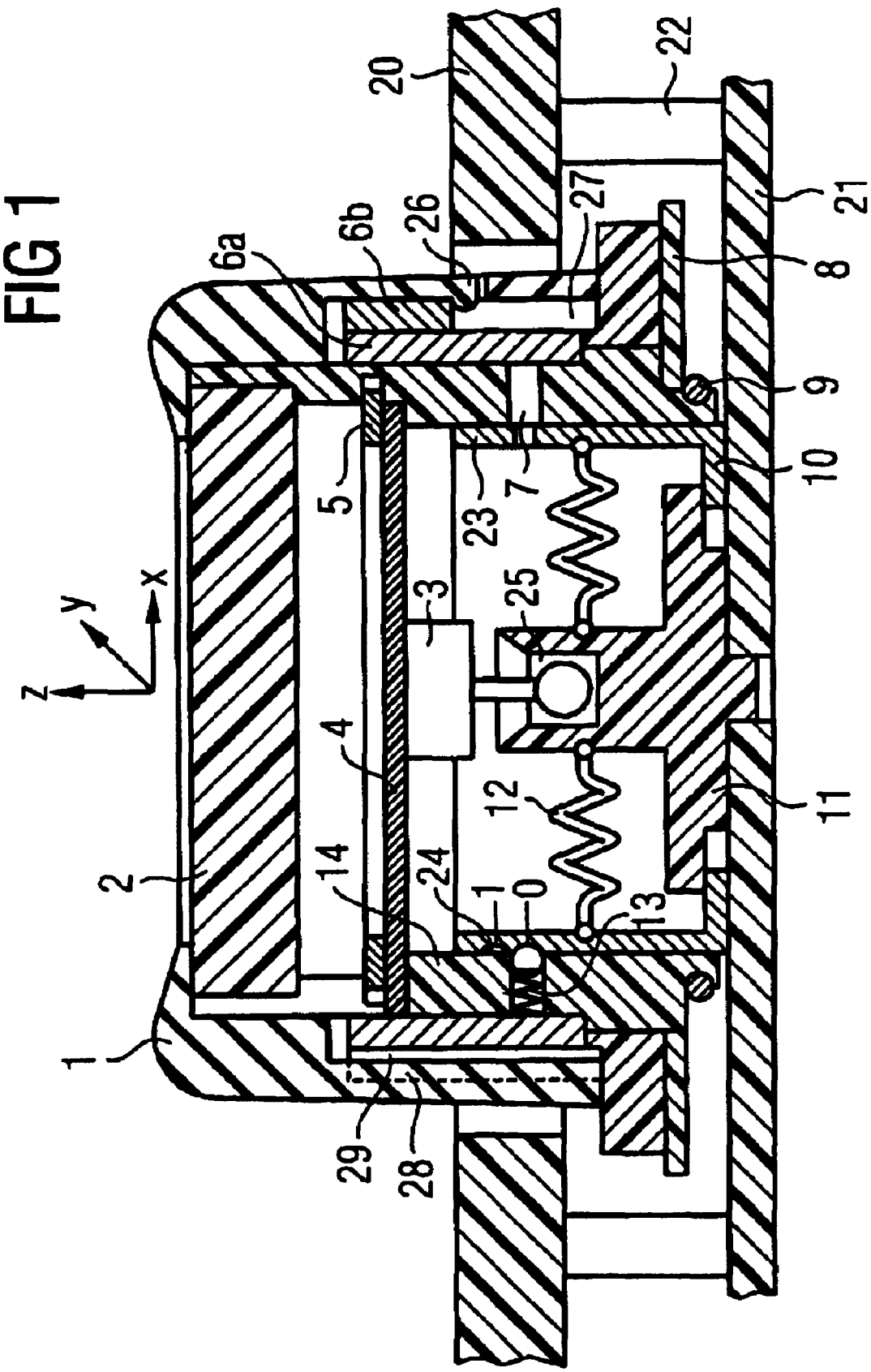
FIG. 1 is a sectional view of an embodiment of an operator control element of an operator control unit according to the invention.

The operator control element according to the invention in FIG. 1 is arranged in a recess in a housing part 20, for example the center console of a motor vehicle. It is seated on a mounting plate 21 which is connected to the housing part 20 by means of spacer pins 22.

In order to move in any desired direction in an x-y plane according to the coordinate system shown in the figure, the operator control element has a sleeve 10 which can move in the x-y direction, but is locked in the z direction by a cotter 11. The sleeve 10 is connected to the cotter 11 by means of restoring spring elements 12 which, on the one hand, permit movement in the x-y direction and, on the other hand, prevent rotation of the sleeve 10 about the z axis. The restoring spring elements 12 force the sleeve 10 back into the position of rest x,y=0 if no force is exerted on the sleeve 10.

A receiving element 14 which is secured against rotation of the receiving element 14 with respect to the sleeve 10 by means of locking elements 7 which engage in a groove 23 in the sleeve 10 is plugged over the sleeve 10.

The sleeve 10 also has depressions 24 into which latching spring elements 13 can engage in order to be able to hold the receiving element 14 in positions of rest in the z direction. Two such positions of rest, indicated by "0" and "1" are shown in FIG. 1. However, in principle further positions of rest are possible in the z direction.

A first printed circuit board 8 is plugged onto the receiving element 14 and is secured in position by a snap ring 9. The inner ring 6a of a ring coder is plugged over the receiving element 14 from the other direction and soldered to the first printed circuit board 8. The outer ring 6b, rotatable with respect to the inner ring 6a, of the ring coder is plugged over the inner ring 6a of the ring coder. The outer and inner rings 6a, 6b may have small grooves and projections (not illustrated) in order to permit latched rotation of the two rings 6a, 6b with respect to one another.

A second printed circuit board 4, on which a joystick 3 is arranged, is inserted into the receiving element 14 in such a way that the joystick 3 projects into a recess 25 in the cotter 11. The second printed circuit board 4 is secured with a securing ring 5. The joystick 3 detects the movement of the sleeve 10 with respect to the cotter 11 in an x-y plane by tilting and outputs corresponding electrical signals which are passed on via the second printed circuit board 4. The joystick 3 is also embodied as a momentary-contact switch which detects a movement of the receiving element 14 in the negative z direction by pressing the operator control element.

At the top, a touchpad 2 is inserted into the receiving element 14. An operator control ring 1 is plugged over the receiving element 14 and the ring coder 6a, 6b and, on the one hand, engages by means of latching projections 26 in corresponding recesses 27 in the outer ring 6b of the ring coder in order to be secured against pulling off, and, on the other hand, has protrusions 28 on its inner side which engage in grooves 29 of the outer ring 6b of the ring coder in order to transmit a rotation of the operator control ring 1 onto the outer ring 6b of the ring coder.

When protrusions 28, grooves 29, latching projections 26, recesses 27, etc are mentioned in the description, although only one such element can be seen in each case in FIG. 1, this is intended to mean that two or more such elements may also be provided and distributed over the circumference of the operator control element.

With the exemplary embodiment of an inventive operator control element of an operator control unit which is illustrated in FIG. 1, as is apparent from the description, a rotation about the z axis is just as possible as pressing in the negative z direction and pulling in the z direction. In addition, it is possible to push the operator control element in x-y planes in various positions on the z axis in any desired direction. As a result, it is possible, with just one operator control element, to move a cursor on a screen of a multimedia system and, for example by pressing the operator control element, select a certain submenu, displayed on the screen and selected by means of the cursor, from a number of menus, and enter any desired menus in this way. It is advantageously possible to speak back into the main menu from any desired submenu by pulling on the operator control element in the z direction.

The touchpad 2 permits further cursor movements or else recognition of script. The touchpad 2 can either be permanently connected to the operator control ring 1 here, and thus rotate with it, or be permanently connected to the receiving element 14.

The electrical terminals of the printed circuit boards 4, 8 may be led to the outside, for example through the cotter 11. In order to be able to sense the latched positions "0" and "1" of the receiving element 14 electrically, a voltage divider may be implemented. For this purpose, the components comprising the latching spring elements 13 and sleeve 10 form a circuit with which it is possible to tap the resulting voltage difference.

Figure 2:
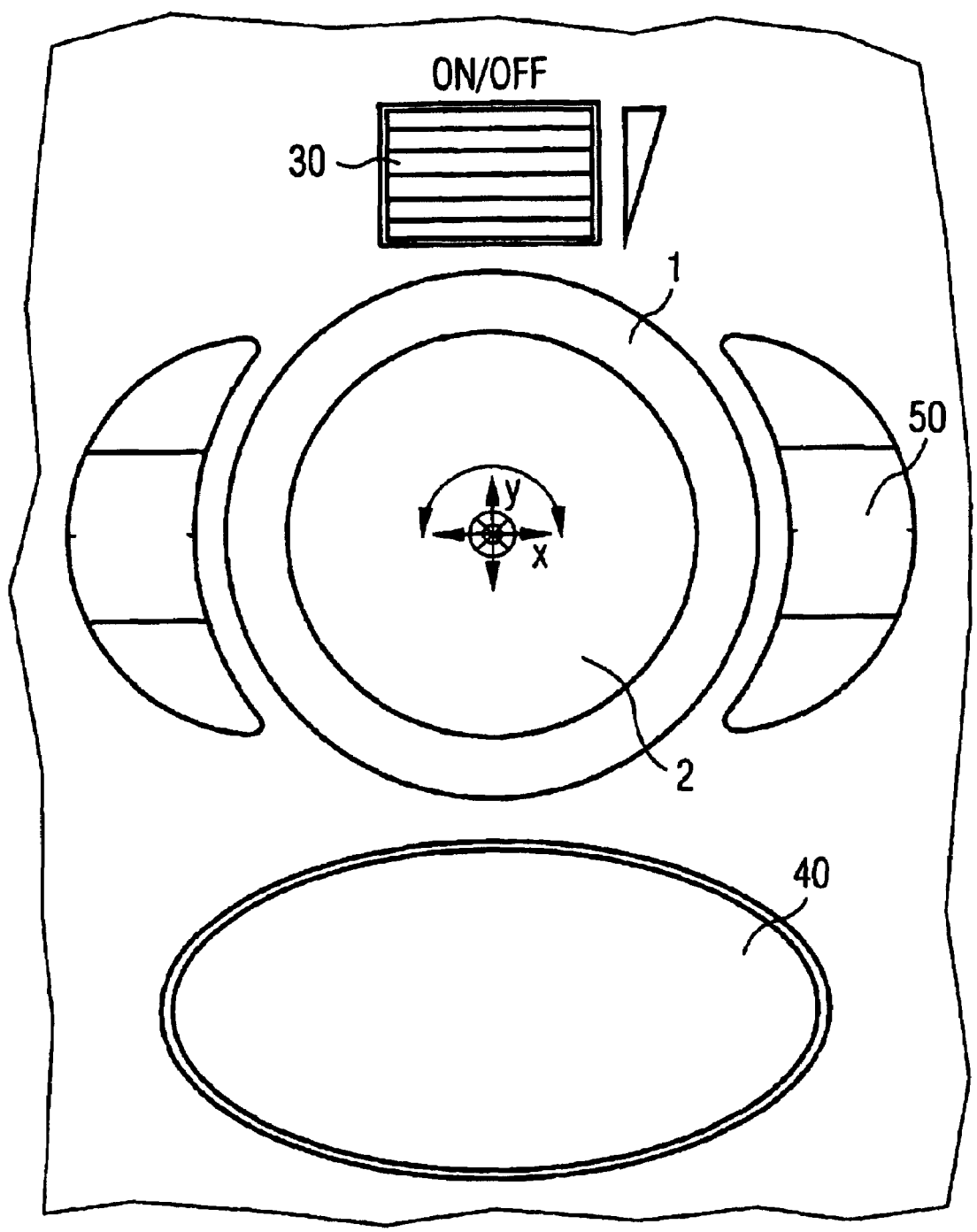
FIG. 2 is a plan view of an operator control unit according to the invention.

FIG. 2 shows a quasi-photographic representation of the plan view of an operator control unit according to the invention. Of the operator control element it is possible to see the operator control ring 1, which can be rotated, pressed, pulled and displaced, as well as the touchpad 2 into which a fingerprint sensor is integrated. The operator control unit which is illustrated also has a depression for a hand 40 for securing a wrist if there is no center arm rest available in the vehicle in order to permit the user to rest the wrist/arm in a relaxed fashion. In addition, an on/off switch 30 is provided in order to activate and deactivate the multimedia system. For specific functions, for example recurring functions, a plurality of pushbutton keys 50 are arranged around the operator control element.

The invention claimed is:

1. An operator control unit for operating a multimedia system in a motor vehicle, comprising:
    a mounting element connectable to a housing;
    an operator control element movably arranged relative to said mounting element for actuating movement of a cursor representable on a screen of the multimedia system, said operator control element being rotatable about an axis of rotation and movable along the axis of rotation, said operator control element being latchable at first and second positions along the axis of rotation, and said operator control element when latched in one of said first and second positions being displaceable only within a planar area orthogonal with the axis of rotation; and
    a touchpad integrated in said operator control element and defining an area orthogonal to the axis of rotation such that said operator control element and said touch pad are moveable in unison alone the axis of rotation and said touch pad is latchable at different orthogonal areas relative to the axis of rotation corresponding to the first and second positions, said touch pad being operable to at least one of recognize script or perform further cursor movements.

2. The operator control unit of claim 1, further comprising restoring elements connected to said operator control element for urging the operator control element to a position of rest in the at least one plane after a deflection.

3. The operator control unit of claim 2, wherein said operator control element is operable for representing movement of a cursor on the screen of the multimedia system such that the speed of the cursor is representable as a function of the distance by which said operator control element is deflected from the rest position.

4. The operator control unit of claim 1, wherein said operator element includes a non-rotatable part and a rotatable part, said touchpad being connected with said non-rotatable part.

5. The operator control unit of claim 1, wherein said operator element includes a non-rotatable part and a rotatable part, said touchpad being connected with said rotatable part.

6. The operator control unit of claim 1, further comprising a fingerprint sensor.

7. The operator control unit of claim 1, wherein movement of the operator control element along the axis of rotation is operable for triggering a function, whereby the function is triggerable by pressing the operator control element along the axis of rotation.

8. The operator unit of claim 1, wherein the movement of the cursor on the screen of the multimedia system is performed through the touchpad.

9. The operator unit of claim 1, wherein the touchpad recognizes script.

10. The operator unit of claim 1, wherein said operator control element having a latching element which operates orthogonally to the axis of rotation to selectively enter depressions defined relative to said mounting element and corresponding to said first and second latching positions.

11. An operator control unit for operating a multimedia system in a motor vehicle, comprising:

a mounting element connectable to a housing;

an operator control element movably arranged relative to said mounting element for actuating movement of a cursor representable on a screen of the multimedia system, said operator control element being rotatable about an axis of rotation and movable along the axis of rotation, said operator control element being latchable at first and second positions along the axis of rotation; and a touch pad integrated in said operator control element and defining an area orthogonal to the axis of rotation such that said operator control element and said touch pad are moveable in unison along the axis of rotation and said touchpad is latchable at different orthogonal areas relative to the axis of rotation corresponding to the first and second positions, movement of the cursor on the screen of the multimedia system being performed through the touchpad.

12. The operator unit of claim 11, wherein said operator control element having a latching element which operates orthogonally to the axis of rotation to selectively enter depressions defined relative to said mounting element and corresponding to said first and second latching positions.

* * * * *